United States Patent
Neukart et al.

(10) Patent No.: US 10,733,877 B2
(45) Date of Patent: Aug. 4, 2020

(54) SYSTEM AND METHOD FOR PREDICTING AND MAXIMIZING TRAFFIC FLOW

(71) Applicants: VOLKSWAGEN AG, Wolfsburg (DE); AUDI AG, Ingolstadt (DE)

(72) Inventors: Florian Neukart, San Francisco, CA (US); Gabriele Compostella, Munich (DE); Christian Seidel, Munich (DE); David Von Dollen, San Francisco, CA (US)

(73) Assignees: Volkswagen AG (DE); Audi AG (DE)

( * ) Notice: Subject to any disclaimer, the term of this patent is extended or adjusted under 35 U.S.C. 154(b) by 373 days.

(21) Appl. No.: 15/827,854

(22) Filed: Nov. 30, 2017

(65) Prior Publication Data
US 2019/0164418 A1    May 30, 2019

(51) Int. Cl.
| | | |
|---|---|---|
| G08G 1/01 | (2006.01) | |
| G08G 1/0967 | (2006.01) | |
| G01C 21/34 | (2006.01) | |
| G08G 1/0968 | (2006.01) | |

(52) U.S. Cl.
CPC .......... G08G 1/0145 (2013.01); G01C 21/34 (2013.01); G08G 1/0112 (2013.01); G08G 1/0133 (2013.01); G08G 1/096741 (2013.01); G08G 1/096888 (2013.01)

(58) Field of Classification Search
CPC .. G08G 1/0145; G08G 1/0112; G08G 1/0133; G08G 1/096741; G08G 1/096888; G01C 21/34
USPC ....................................................... 701/119
See application file for complete search history.

(56) References Cited

U.S. PATENT DOCUMENTS

| | | | |
|---|---|---|---|
| 2014/0278031 A1 | 9/2014 | Scofield et al. | |
| 2014/0324326 A1 | 10/2014 | Taylor | |
| 2016/0260013 A1 | 9/2016 | Rønnow et al. | |
| 2017/0270413 A1 | 9/2017 | Moreira-Matias et al. | |
| 2017/0357539 A1* | 12/2017 | Dadashikelayeh | G06F 16/25 |
| 2018/0315476 A1* | 11/2018 | Ishii | G11C 13/047 |

FOREIGN PATENT DOCUMENTS

| | | |
|---|---|---|
| CA | 2915760 A1 | 6/2017 |
| EP | 3035314 A1 | 6/2016 |

OTHER PUBLICATIONS

Compostella; Quantum Computing at Volkswagen: Traffic Flow Optimization using the D-Wave Quantum Annealer; D-Wave Users Group Meeting; Sep. 27, 2017; National Harbour, Maryland.
Fouladgar et al.; Scalable Deep Traffic Flow Neural Networks for Urban Traffic Congestion Prediction; IEEE Conference Proceedings; Jan. 1, 2017.
Kanestrøm et al.; Traffic flow forecasting with deep learning; Norwegian University of Science and Technology; Jan. 1, 2017.

(Continued)

*Primary Examiner* — Marthe Y Marc-Coleman
(74) *Attorney, Agent, or Firm* — Barnes & Thornburg LLP

(57) ABSTRACT

A traffic flux maximization method and system to control traffic flow by combining classical computing machine learning to predict traffic flux minimization before its occurrence, with quantum annealing to optimize future positions of vehicles. Vehicles are redirected to minimize the travel time for each vehicle, taking into account other vehicles in the road network.

18 Claims, 11 Drawing Sheets

(56) References Cited

OTHER PUBLICATIONS

Kofod-Petersen; Structured Literature Review Protocol; Appendix A; 2014.
Neukart et al.; Traffic flow optimization using a quantum annealer; Aug. 9, 2017.
Polson et al.; Deep Learning for Short-Term Traffic Flow Prediction; Transportation Research, Part C; Emerging Technologies; Feb. 27, 2017; vol. 79.
Primeur Magazine; Solving traffic jam with a quantum computer; Jul. 7, 2017; pp. 1-2.
Search Report and Written Opinion from International Patent Application No. PCT/EP2018/082778; dated Mar. 7, 2019.
Babbush et al.; Construction of Energy Functions for Lattice Heteropolymer Models: A Case Study in Constraint Satisfaction Programming and Adiabatic Quantum Optimization; 2012; Advances in Chemical Physics, in press; downloaded from https://arxiv.org/abs/1211.3422.
Benedetti et al.; Estimation of effective temperatures in a quantum annealer and its impact in sampling applications: A case study towards deep learning applications; 2015; downloaded from https://arxiv.org/abs/1511.02581.
Biamonte et al.; Quantum Machine Learning; 2016; arXiv: 1611.09347 [quant-ph].
Bishop; Pattern Recognition and Machine Learning; 2006; Springer.
Boeing; OSMnx: New Methods for Acquiring, Constructing, Analyzing, and Visualizing Complex Street Networks; 2017; doi:10.2139/ssrn.2865501.
Boixo et al.; Quantum annealing with more than one hundred qubits; 2014; downloaded from https://arxiv.Org/abs/1304.4595.
Booth et al.; D-Wave: Partitioning Optimization Problems for Hybrid Classical/Quantum Execution; 2016; downloaded from https://github.com/dwavesystems/qbsolv/blob/master/qbsolv_techReport.pdf.
Eisenkramer; Volkswagen Trials Quantum Computers; 2017; Springer Professional; downloaded from https://www.springerprofessional.de/en/automotiveelectronics—software/companies—institutions/volkswagen-trials-quantum-computers/12170146?wt_mc=offsi.emag.mtzworldwide.rssnews.-.x.
Ioffe et al.; Batch normalization: Accelerating deep network training by reducing internal covariate shift; 2015; arXiv preprint arXiv:1502.03167.
Isakov et al.; Understanding Quantum Tunneling through Quantum Monte Carlo Simulations; 2015; downloaded from https://arxiv.Org/abs/1510.08057.
Jiang et al.; Non-commuting two-local Hamiltonians for quantum error suppression; 2015; downloaded from https://arxiv.org/abs/1511.01997.
King et al.; Quantum Annealing amid Local Ruggedness and Global Frustration; 2017; arXiv:1701.04579 [quant-ph].
Korenkevych et al.; Benchmarking Quantum Hardware for Training of Fully Visible Boltzmann Machines; 2016; arXiv:1611.04528 [quant-ph].
Lanting et al.; Entanglement in a Quantum Annealing Processor; 2013; Phys. Rev. X 4, 021041.
Nair et al.; Rectified linear units improve restricted Boltzmann machines; in Proceedings of the 27th International Conference on Machine Learning (ICML-10); 2010; pp. 807-814.
Nesterov et al.; Gradient methods for minimizing composite objective function; 2007; Technical report, UCL.
Neukart et al.; Transgenetic NeuroEvolution; Proceedings of OPTIM; 2012.
Neukart et al.; On Quantum Computers and Artificial Neural Networks; Signal Processing Research; 2013; vol. 2, No. 1; pp. 1-11.
Neukart et al.; Operations on Quantum Physical Artificial Neural Structures; Procedia Engineering; 2014; vol. 69; pp. 1509-1517.
O'Gorman et al.; Bayesian Network Structure Learning Using Quantum Annealing; 2014; downloaded from https://arxiv.org/abs/1407.3897.
Pascanu et al.; Understanding the exploding gradient problem; Computing Research Repository (CoRR); 2012; abs/1211.5063.
Perdomo-Ortiz et al.; Finding lowenergy conformations of lattice protein models by quantum annealing; 2012; downloaded from https://arxiv.org/abs/1204.5485.
Perdomo-Ortiz et al.; A Quantum Annealing Approach for Fault Detection and Diagnosis of Graph-Based Systems; 2014; downloaded from https://arxiv.org/abs/1406.7601.
Rieffel et al.; A case study in programming a quantum annealer for hard operational planning problems; 2014; downloaded from https://arxiv.org/abs/1407.2887.
Senior et al.; An empirical study of learning rates in deep neural networks for speech recognition. In Acoustics, Speech and Signal Processing (ICASSP); IEEE International Conference; 2013; pp. 6724-6728.
Smelyanskiy et al.; Quantum annealing via environment-mediated quantum diffusion; 2015; downloaded from https://arxiv.org/abs/1511.02581.
Srivastava et al.; Dropout: A simple way to prevent neural networks from overruling; The Journal of Machine Learning Research; 2014; vol. 15, No. 1; pp. 1929-1958.
Venturelli et al.; Quantum Optimization of Fully-Connected Spin Glasses; 2014; downloaded from https://arxiv.org/abs/1406.7553.
Venturelli et al.; Quantum Annealing Implementation of Job-Shop Scheduling; 2015; downloaded from https://arxiv.org/abs/1506.08479.
Wang et al.; Classical signature of quantum annealing; 2013; downloaded from https://arxiv.Org/abs/1305.5837.
Yuan et al.; T-drive: driving directions based on taxi trajectories; in Proceedings of the 18th SIGSPATIAL International Conference on Advances in Geographic Information Systems; GIS '10; 2010; pp. 99-108.
Yuan et al.; Driving with knowledge from the physical world; in the 17th ACM SIGKDD international conference on Knowledge Discovery and Data mining; KDD'11; 2011.
Zheng; T-Drive trajectory data sample; Microsoft; 2011; downloaded from https://www.microsoft.com/en-us/research/publication/t-drive-trajectory-data-sample/.
D-Wave; Developer Guide for Python; 2016.
D-Wave; Quantum Computing, How D-Wave Systems Work; 2017; downloaded from https://www.dwavesys.com/quantum-computing.
Los Alamos National Labroatory; D-Wave 2X Quantum Computer; 2016; downloaded from http://www.lanl.gov/projects/national-security-education-center/information-sciencetechnology/dwave/.

* cited by examiner

SYSTEM AND METHOD FOR PREDICTING AND MAXIMIZING TRAFFIC FLOW

FIELD

The present disclosure relates to systems, components, and methodologies for predicting and controlling traffic flow. In particular, the present disclosure relates to systems, components, and methodologies that predict and maximize traffic flow based on a combination of quantum annealing and classical machine learning.

BACKGROUND

Maximizing traffic flow within an area, such as a city, so that stop-and-go traffic and traffic jams do not occur is a complex optimization problem, which thus far has not been efficiently solved with classical computers in short or even finite time. The problem at hand is NP-hard, as there is a combinatorial explosion in the solution space, which currently makes it impossible or near impossible for classical computers to calculate the optimal solution or a solution close to the optimum within seconds. For example, assuming 500 cars cause traffic flux minimization on a certain road or road segment, and 3 alternative routes per car are provided, then the solution space is of the size $3^{500}$.

Current systems focus on real-time analysis of traffic data and redistribute traffic without considering the traffic in the target areas. When congestion on route A occurs, vehicles are redistributed to route B, but may cause congestion there. More sophisticated models are based on a fluid dynamics-approach.

Therefore, there is a need for a traffic flux maximization system that does not result in a significant decrease flux in another area; continually or permanently optimizes traffic flux, ideally based on interval data transmitted from vehicles; and recognizes traffic minimization sufficiently prior in time before it happens.

SUMMARY

According to the present disclosure, systems, components, and methodologies are provided for maximization of traffic flow (flux) at a given point in time.

In accordance with disclosed embodiments, structure and software are provided to control traffic flow by combining classical computing machine learning to predict traffic flux minimization before its occurrence, with quantum annealing to optimize future positions of vehicles. The methods and systems redirect vehicles to minimize the travel time for each vehicle, while considering other relevant vehicles in the road network.

In accordance with at least one embodiment of a traffic control system, redistribution of vehicles considers other vehicles in the road network and seeks to avoid traffic flux minimization in the areas to which vehicles are redistributed. The disclosed methods and systems seek to maximize traffic flux at a given point in time and at a selected location. The speed limit associated with the sought traffic flux may not be the allowed speed limit, but could be less than the allowed speed limit for the roadway segment, depending at least in part on traffic conditions. For example, 10 mph for each vehicle compared to a traffic jam, which is no movement at all, even if the designated speed limit is 25 mph.

In accordance with at least one embodiment of a traffic control system, vehicles transmit position data in time intervals of a fixed duration, for example five seconds. The traffic flow maximization system recalculates the optimal distribution of all vehicles under consideration in the target areas.

To address limitations of classical computing, a quantum annealing system is used in accordance with disclosed embodiments. The method allows for determining an optimal solution or a solution close to the optimum possibly within milliseconds, and may achieve traffic flow maximization at any given point in time. Implementation of quantum computing improves the computational speed because quantum computing is probabilistic, whereas classical computing is deterministic. In accordance with at least one embodiment of a traffic control system, the traffic flux optimization is reformulated as a quadratic unconstrained binary optimization (QUBO) problem, which forms the foundation of the method.

Additional features of the present disclosure will become apparent to those skilled in the art upon consideration of illustrative embodiments exemplifying the best mode of carrying out the disclosure as presently perceived.

BRIEF DESCRIPTION OF THE FIGURES

The detailed description particularly refers to the accompanying figures, which depict illustrative embodiments, and in which.

DETAILED DESCRIPTION

The figures and descriptions provided herein may have been simplified to illustrate aspects that are relevant for an understanding of the described devices, systems, and methods, described herein while eliminating, for the purpose of clarity, other aspects that may be found in typical devices, systems, and methods. Those of ordinary skill may recognize that other elements or operations may be desirable or necessary to implement the devices, systems, and methods described herein. Because such elements and operations are well known in the art, and because they do not facilitate a better understanding of the present disclosure, a discussion of such elements and operations may not be provided herein. However, the present disclosure is deemed to inherently include all such elements, variations, and modifications to the described aspects that could be implemented by those of ordinary skill in the art.

Disclosed methods allow for the maximization of traffic flow (flux) at any given point in time. To improve the overall traffic flow within an area (such as a city) so that stop-go traffic and traffic jams do not occur is a complex optimization problem, which cannot be efficiently solved with classical computers Disclosed embodiments may be implemented in conjunction with components of autonomous driving systems and driver assistance systems included in automotive vehicles.

Although certain embodiments have been described and illustrated in exemplary forms with a certain degree of particularity, it is noted that the description and illustrations have been made by way of example only. Numerous changes in the details of construction, combination, and arrangement of parts and operations may be made. Accordingly, such changes are intended to be included within the scope of the disclosure, the protected scope of which is defined by the claims.

Figure 1:
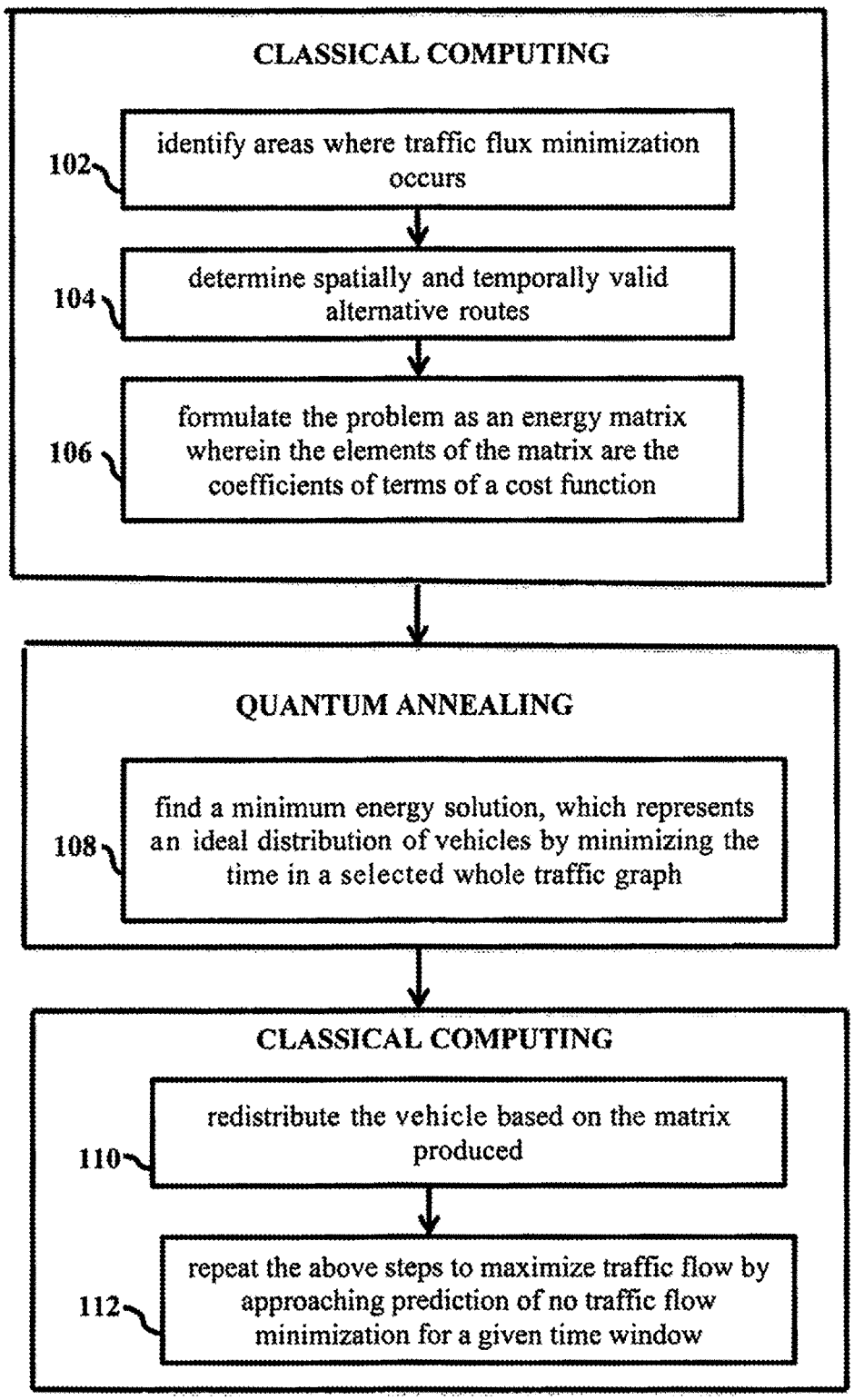
FIG. 1 is an illustrative flowchart of a disclosed embodiment of a method for controlling traffic flow.

FIG. 1 is a flowchart of an illustrative embodiment of a method for controlling traffic flow. The method includes predicting traffic flux minimization before occurrence using machine learning on classical computing and optimizing future positions of vehicles such that a redirection maximizes traffic flux to minimize travel time for each vehicle, wherein optimization includes accounting for other vehicles in a road network using quantum annealing.

Classic computing is used for steps 102, 104, 106. In step 102 areas where traffic flux minimization occurs are identified. In step 104 spatially and temporally valid alternative routes are determined. The problem is formulated as an energy matrix wherein the elements of the matrix are the coefficients of terms of a cost function in step 106.

The method proceeds using quantum annealing in step 108 wherein a minimum energy solution is found, which represents an ideal distribution of vehicles by minimizing the time in a selected whole traffic graph. The whole traffic graph is an area under consideration when maximizing traffic flux.

Classical computing is then used for steps 110, 112. In step 110 the vehicle is redistributed based on the matrix produced. In step 112, steps 102-110 are repeated to maximize traffic flow by approaching prediction of no traffic flow minimization for a given time window.

The term "vehicle" is used here, which may include cars, trucks, motor cycles or other vehicles that may be on a roadway. Because sizes of vehicles can affect traffic density, they may be considered in calculations according to illustrative embodiments.

Figure 2:
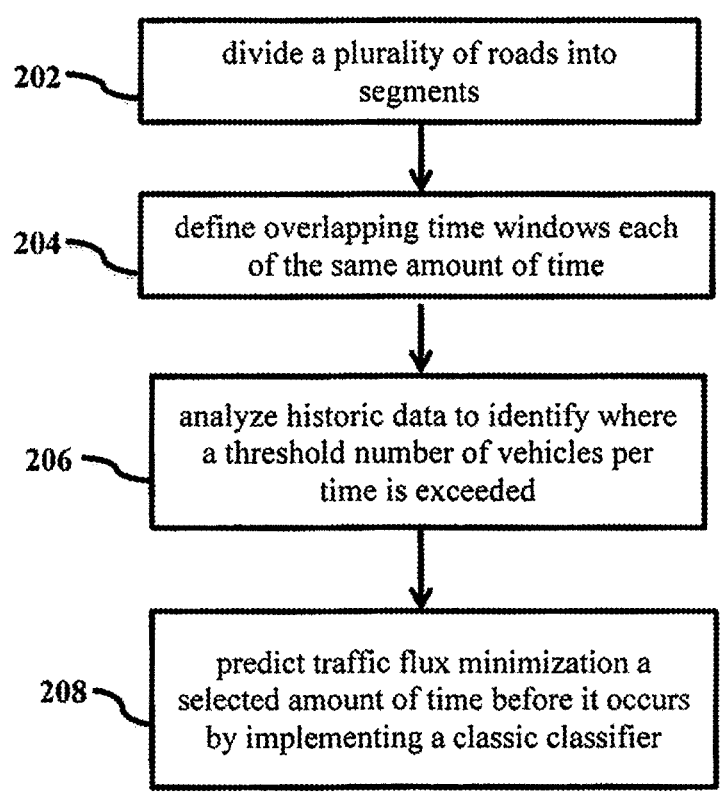
FIG. 2 is a flow chart of an illustrative method for identifying where traffic flux minimization occurs.

FIG. 2 is a flow chart of an illustrative method for identifying where traffic flux minimization occurs. A plurality of roads is divided into segments in step 202. In step 204 overlapping time windows are defined, each of the same amount of time. In step 206, historical data is analyzed to identify where a threshold number of vehicles per time is exceeded. Traffic flux minimization is predicted a selected amount of time before it occurs by implementing a classic classifier in step 208. In an illustrative example, the selected amount of time before traffic flux minimization occurs is 15 minutes. Illustrative selected times are in the range of greater than zero to 18 minutes; and 10 minutes to 16 minutes.

As described above with respect to FIG. 1, the problem is formulated as an energy matrix wherein the elements of the matrix are the coefficients of terms of a cost function. In an illustrative embodiment, the cost function is occupancy of a street segment for all vehicles i, with proposed routes $j \in \{1,2,3\}$ with segments $S_j$, which share the street segment $s \in S_j$, and is given by:

$$\text{cost}(s) = \left( \sum_i \sum_j \sum_{s \in S_j} q_{ij} \right)^2$$

wherein $q_{ij}$ is a binary variable that defines each unique combination of vehicle to route that represents vehicle I taking route j. Application of the cost function and the related variables are described in more detail below.

To maximize traffic flow by approaching prediction of no traffic flow minimization for a given time window a starting time window must first be set. From this starting point a probability is predicted that traffic flux minimization will occur within the window. In an illustrative embodiment, the traffic flux minimization is predicted a selected amount of time before it occurs includes by using a convolutional neural network to learn patterns in the historic data that cause traffic flux minimization, and outputting from the neural network a first neuron estimating the probability of a traffic jam, and a second neuron estimating the probability of no traffic jam. Further details of the calculation are provided below.

Figure 3:
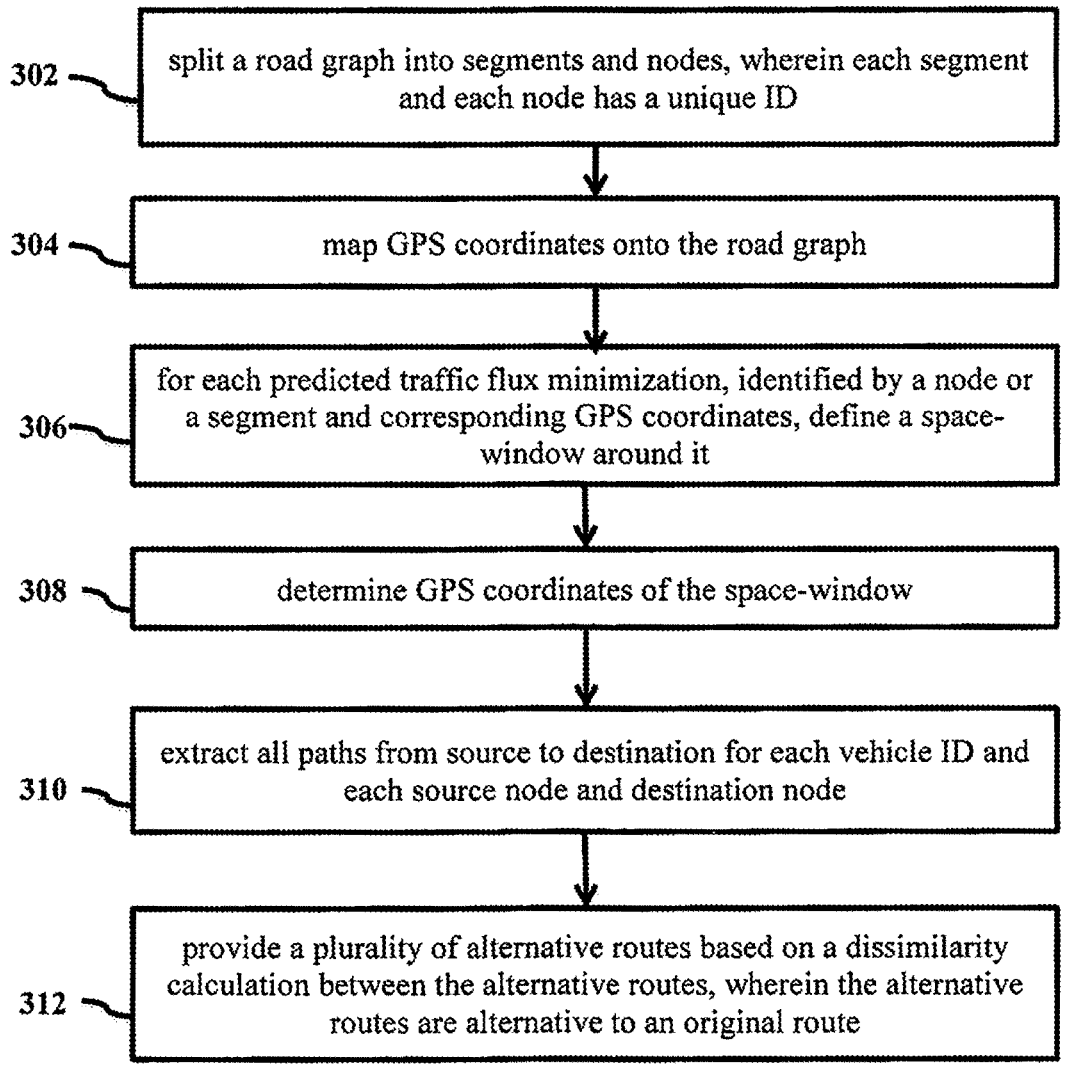
FIG. 3 is a flow chart of an illustrative embodiment for determining alternative routes.

FIG. 3 is a flow chart of an illustrative embodiment for determining alternative routes. Vehicles are redirected so time from each vehicle's source location to its target location is minimized taking into consideration vehicles already on the alternative routes. In step 302 a road graph is split into segments and nodes, wherein each segment and each node has a unique ID. An ID may include, for example, a time stamp, GPS coordinates and vehicle identification information. Collectively, this is included in the traffic data on which the system and methods act. For simplicity, the term "GPS coordinates" is used herein, but it is understood that other methods and systems for identifying the location of vehicles, roads, nodes, portions thereof or other objects can be used in embodiments of the traffic control system.

In step 304 GPS coordinates are mapped onto the road graph. For each predicted traffic flux minimization identified by a node or a segment and corresponding GPS coordinates, a space-window around it is defined in step 306. In step 308 GPS coordinates of the space-window are determined. In step 310 all paths from source to destination for each vehicle ID and each source node and destination node are determined. A plurality of alternative routes based on a dissimilarity calculation between the alternative routes, wherein the alternative routes are alternative to an original route are then provided in step 312. The sufficiency of similarity between routes depends, at least in part, on characteristics of the traffic graph. As will be described further below, the GPS coordinates may be mapped onto the road graph by calculating the Haversine distance between each segment's or node's GPS coordinates and the vehicle GPS coordinates.

As described with respect to FIG. 3 above, the road graph is split into segments and nodes, wherein each segment and each node has a unique ID. The unique ID to each segment and to each node may be applied to the road graph from which the segments and nodes are obtained or they may be extracted from a map system in which the IDs are incorporated, such as a publically available source such as OpenStreetMap.

Figure 4:
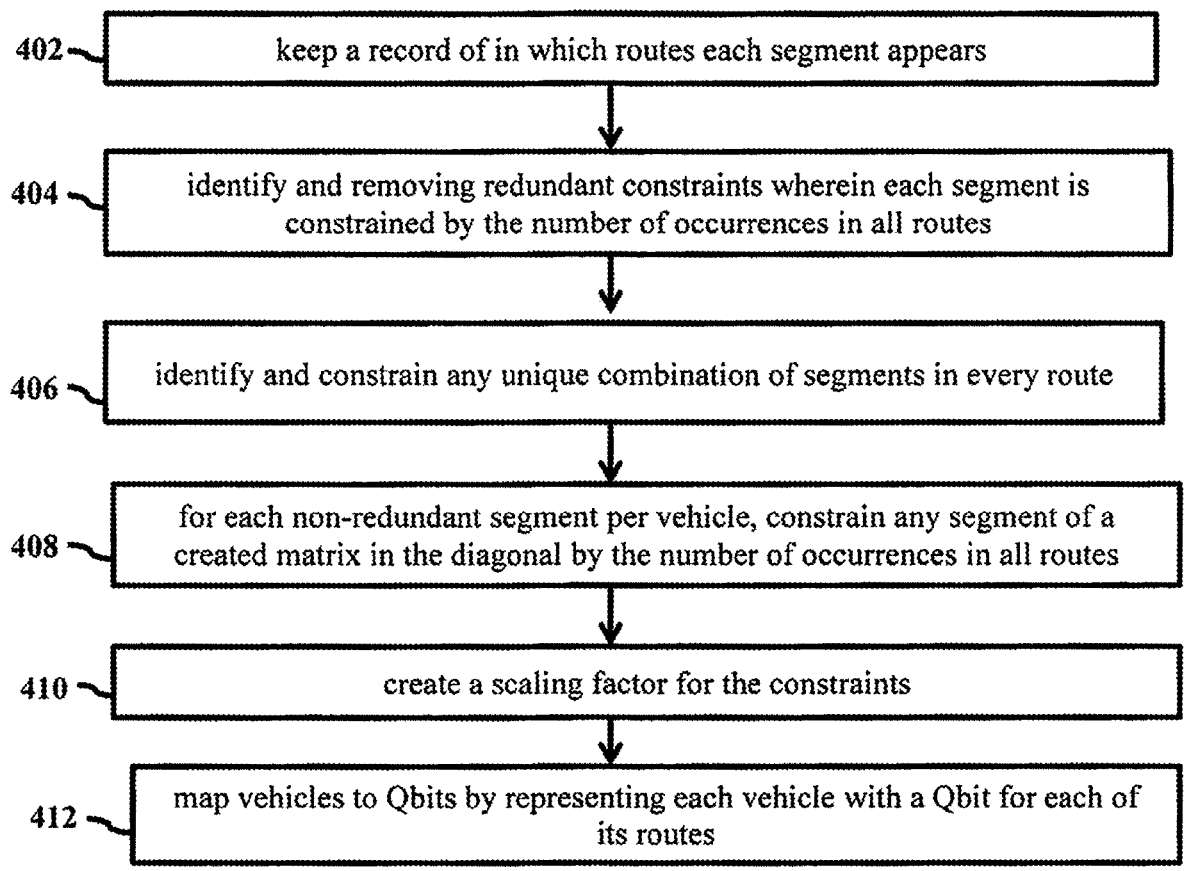
FIG. 4 is a flowchart showing how street occupancy in a given area may be minimized

As described with respect to step 106, the problem is formulated as an energy matrix wherein the elements of the matrix are the coefficients of terms of a cost function. In an illustrative embodiment, the problem is formulated as a quadratic unconstrained binary optimization (QUBO) matrix. FIG. 4 is a flowchart showing how street occupancy in a given area is minimized, wherein the street occupancy is the sum of the cost functions for each segment, according to an illustrative embodiment. Street occupancy in a given area is minimized by selecting one of three possible routes for each vehicle that has the least segment overlaps among the routes. This may be performed illustratively by keeping a record of in which routes each segment appears as provided in step 402. In step 404 redundant constraints are identified and removed, wherein each segment is constrained by the number of occurrences in all routes. In step 406 unique combination of segments in every route are identified and constrained. For each non-redundant segment per vehicle, any segment of a created matrix in the diagonal is constrained by the number of occurrences in all routes in step 408. A scaling factor for the constraints is then created in step 410. In step 412, in accordance with quantum annealing, vehicles to Qbits are mapped by representing each vehicle with a Qbit for each of its routes.

Figure 5:
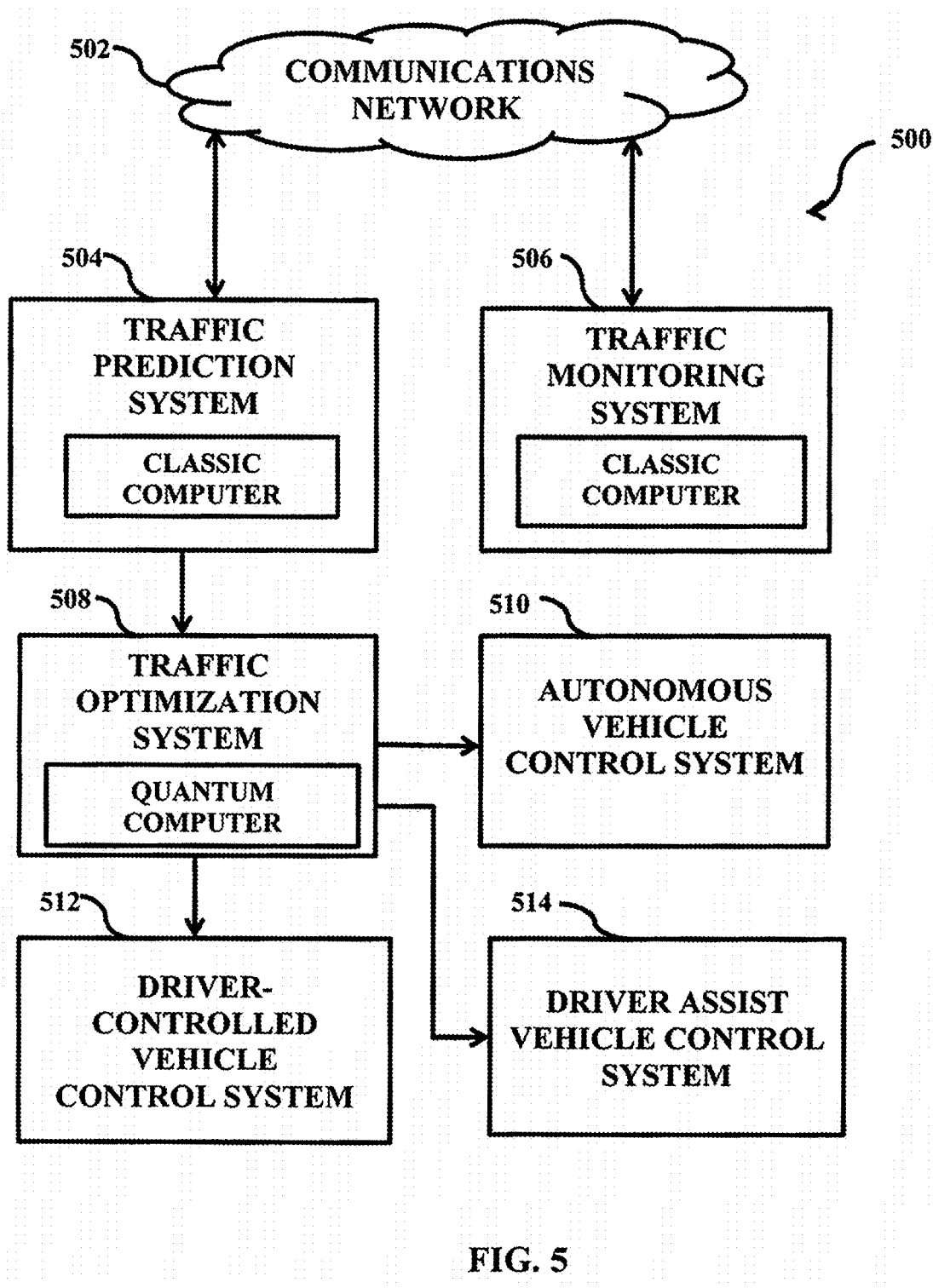
FIG. 5 is a schematic diagram depicting a traffic flux maximization system.

FIG. 5 depicts a traffic flow maximization system 500. A communications network 502 is in communication with a traffic monitoring system 506 and a traffic prediction system 504. Information is relayed back and forth from traffic monitoring system 506 and traffic prediction system 504 to communications network 502, for example, via the cloud. Traffic is monitored by traffic monitoring system 506 using classic computing on a classic computer, containing, for example, a central processing unit (CPU), memory and other components that will be described in more detail below. Vehicles may have an ID generating system that generates vehicle identification information that can be used for vehicle monitoring purposes. The identification information may include, for example, a time stamp, vehicle location, such as by GPS coordinates and a time stamp associated with the GPS coordinates. Vehicles may also contain sensors that relay information to communications network 502. A verification component may also be included in the vehicle monitoring system or a remote verification system may be used that received the vehicle identification information and relays back to traffic monitoring system 506 either directly or thorough communication network 502 a verification determination. Traffic monitoring system 506 continually or at particular intervals updates the system with information and is updated with information from other components of the system, including the vehicle.

Traffic prediction system 504 also contains a central processing unit, memory and additional components that will be described in further detail below. As used herein, "central processing unit" or "CPU" will refer to one or more processing units used for classical computing. Traffic prediction system 504 identifies where traffic flux minimization occurs. traffic prediction system 504 includes software with code which when executed carries out the algorithms described herein to predict traffic flux minimization before it occurs, for example less than fifteen minutes before it occurs. Traffic prediction system 504 includes a component to divide a plurality of roads into segments or access to an application that provides segmented road graphs. Traffic prediction system 504 obtains information via communications network 502 that may be generated by or originated from traffic monitoring system 506. The information received is input into algorithms as described herein that provide traffic prediction functionality. Traffic prediction system 504 may then relay traffic predictions via communications network 502 to other components of traffic flow maximization system 500.

Traffic optimization system 508 receives data from traffic prediction system 504, and acts on it to maximize traffic flux. Traffic optimization system 508 includes a quantum processing unit, on which quantum annealing algorithms are executed. The quantum annealing algorithms when executed, via the quantum processing unit, find a minimum energy solution, which represents an ideal distribution of vehicles by minimizing the time in a selected whole traffic graph. Traffic optimization data from traffic optimization system 508 is directed to vehicle control systems, thereby redistributing vehicles on the roadways. The traffic optimization may be applied to various types of vehicle control systems. For example, it can be applied to a fully autonomous vehicle control system 510, wherein the vehicle will automatically be guided along a route selected traffic optimization system 508. Traffic optimization system 508 could also relay route selections to a driver-controlled vehicle control system 512 or a standalone system, that provides the driver the ability to accept or reject the route selection generated by traffic optimization system 508, and wherein the vehicle is controlled by the driver. A driver assist vehicle control system 514 may also be employed in which a driver may select or override a selection generated by traffic optimization system 508, but the vehicle will automatically follow the route selection generated and accepted or not rejected.

Traffic flow maximization system 500 can be implemented with a distributed architecture, wherein components may be hosted on different platforms and communicate through a network.

Figure 6:
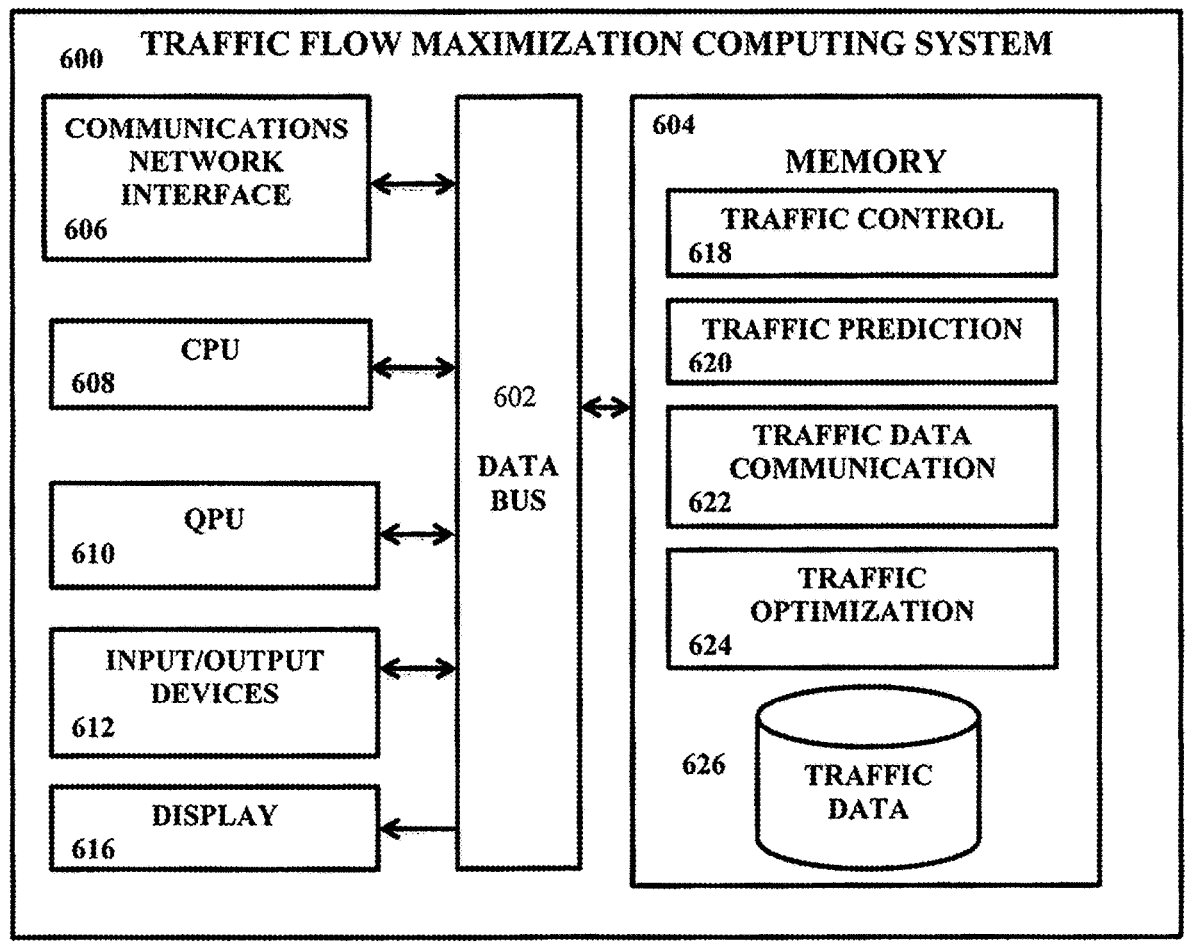
FIG. 6 is a schematic diagram of a traffic flux maximization computing system containing a central processing unit and a quantum processing unit.

FIG. 6 is a schematic diagram of portions of a traffic flux maximization computing system containing a central processing unit and a quantum processing unit. The methods described herein may be implemented by software and compiled and stored to a memory 604 as software code. During runtime, the software may be invoked for execution by a one or more processor, for example CPU 608 and quantum processing unit 610. A memory controller may manage the flow of data by interfacing between memory 604 and CPU 608 and QPU 610. A system or data bus 602 electronically connects memory 604 to communications network interface 606. The network may be, for example, the Internet or a proprietary network. Input/output device 612 communicates through system or data bus 602 with CPU 608 and quantum processing unit 610 to receive and transmit data and commands the components. Components of traffic flow maximization system 600 may communicate with one another through any suitable electronic communication mechanism, such as a data bus 602 or cabling. Communication may also be provided wirelessly, such as (Wi-Fi), NFC, Bluetooth®, or other suitable technologies.

Communications network interface 606, which may include a network adaptor, allows the system to communicate over a network with other computers, server, the cloud or networking devices, such as over a LAN connection. A peripheral controller may be configured to facilitate operation of peripheral devices, such as input devices 612, for example, which may be is required when the system is implemented in a driver-controlled vehicle or a vehicle with driver assist mechanisms. Input/output devices 612 more generally refer to components to facilitate communications between other components whether or not the system is entirely automated, partially automated, or requires user input. A display 616, which may be associated with a display controller, may provide visual traffic information to a user, such as route and map displays. It will be understood that some of the components of FIG. 6 may be incorporated into a single device, or a plurality of devices. An operating system can manage computer hardware and software resources of the delivery system.

Memory 604 may include, for example, traffic control memory 618 to operate traffic control functionality to control vehicles utilizing the system; traffic prediction memory 620 to predict hotspots and other traffic flow occurrences or characteristics; traffic data communication memory 622 to transmit and receive traffic data within the system between components and from external sources; traffic optimization memory 624 to provide functionality for maximizing traffic flux by routing vehicles to minimize hotspots; and traffic data storage 626, to store data required for system performance. Traffic data storage 626 may include data that is analyzed to redistribute traffic, including data on the current vehicle and other vehicles that can affect traffic flow of the present vehicle. Traffic data storage 626 may also store vehicle identification data, such as, a time stamp, GPS coordinates and other vehicle identification information.

Further detail is now provided regarding the combination of quantum annealing methods and classic computing to predict and maximize traffic flow. The detail is provided as an example run using data from taxis. As the method can be applied to other kinds of vehicles, the term "vehicle" will be used in the example. The traffic flow optimization problem is defined as a minimization problem, in which the time from source to destination for each vehicle is the quantity to be minimized. Thus, flux is maximized, wherein maximizing flux can be defined as minimizing the number of vehicles passing a specific point in a specific time interval or window. In an illustrative example, to ensure reproducibility, a publically available T-Drive trajectory dataset containing trajectories of 10,357 taxis recorded over one week was used. The dataset featured about 15 million points, and the total distance of the trajectories made up about 9 million kilometers. Only data of about 20 vehicles had been transmitted in intervals of 1-5 seconds, thus the data was enriched for the other vehicles transmitting in 5-20 minute intervals by creating additional GPS points such that signals in intervals of 1-5 s for all vehicles were available for use.

The goal is to minimize the time from source to destination for each vehicle in the traffic graph, thus optimizing the flow towards time, which requires the problem to be split into three sub-problems. As used herein, "classical" refers to calculations on classical machines, and quantum refers to calculations on a quantum annealing system. The first of the three problems, containing steps 1-3 below is carried out by classical computing. Step 4 is then implemented with quantum computing. Finally, steps 5 and 6 are carried out using classical computing.

1. Classical: prediction of areas where traffic flow minimization occurs (hotspots) 15 minutes ahead.
2. Classical: Determination of spatially and temporally valid alternative routes (or: answer the question "Is it possible to redistribute a vehicle to one of the alternative routes in time? If not, invalidate the route.")
3. Classical: Formulate the problem as a QUBO and translate it into an Ising-model.
4. Quantum: Find the minimum energy solution, which represents the ideal distribution of vehicles by minimizing the time in the whole traffic graph.
5. Classical: Redistribute the vehicles based on the matrix produced.
6. Classical and quantum: iterate over 1-5 until no traffic flow minimization for the given time window is predicted.

In this example, to address a limited number of available Qbits, instead of letting QSAGE split a QUBO matrix representing all 10.000 taxis and alternative routes into sub-problems, the starting window was set to one of the places where traffic flow minimization (hotspots) are classically predicted. This is done by applying a survival data mining approach:

1. Dividing the roads into segments $S=\{s_1, s_2, \ldots, s_n\}$.
2. Defining overlapping time windows $T=\{t_0 \ldots _n, t_{n \ldots n+n}, t_{n+n \ldots \Sigma_{i=1}^3 n}, \ldots\}$ of n minutes and analyzing on historic data where a threshold of m vehicles per t is exceeded.
3. Training a classifier on the patterns causing hotspots 15 minutes before hotspots occur.

The classic classifier predicting the hotspot is defined in this example as a convolutional neural network with weight decay regularization, Rectified Linear Units (ReLU), Batch Normalization, dropout, stochastic gradient descent with Nesterov momentum, gradient clipping, and learning rate scheduling, and softmax activation in the output layer. The output of the network is given by two neurons, the first one estimating the probability of traffic jam, the second one estimating the probability of "no jam".

Figure 7:
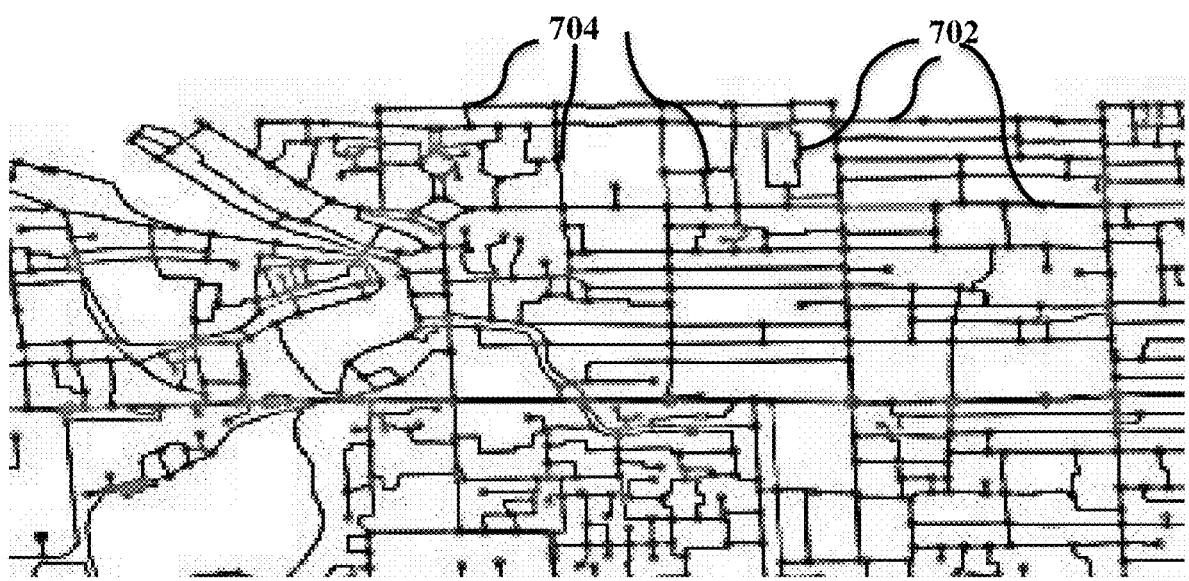
FIG. 7 is a portion of a map showing nodes and segments.

Data preparation will now be described for the classical determination of valid alternative routes according to this illustrative example. For further describing the quantum traffic flow optimization, focus is on a specific situation in which traffic flow minimization was predicted for a route from Beijing airport to the city center, with 418 vehicles causing or being affected by the jam. In this specific scenario, the goal was to redirect all 418 vehicles on alternative routes such that the traffic flow on the initial and target routes is maximized (i.e. time from source to target for each vehicle is minimized) under consideration of the vehicles already driving on the target routes. In other words, a redistribution of vehicles should not cause a traffic jam anywhere else. For splitting the roads into segments, an application such as OSMnx API may be used, which retrieves, constructs, analyzes and visualizes street networks from OpenStreetMap. OSMnx API or the like can be used to split the road graph, in this case the graph of Beijing, into segments and nodes, each of which is returned with a unique ID. It is noted that the unique IDs may be assigned by the system, or input as needed if a map application used does not include node or segment IDs. The proceeding method can be summarized as follows:

1. Extract the road graph from the Beijing city map with OSMnx, which returns a list of segments 702 with IDs, and a list of nodes 704 with respective IDs. Nodes represent intersections of segments, and segments are edges connecting the nodes, representing the streets, a portion of which is shown in FIG. 7. For simplicity, only a few segments 702 and nodes 704 are identified in FIG. 7
2. The T-Drive Trajectory dataset contains GPS coordinates for the vehicles, which were mapped onto the graph. The Haversine-distance was chosen (eqs. 1-3) for determining the closest nodes to each start and end-coordinate on the graph:

$$a = \sin^2\left(\Delta\frac{lat}{2}\right) + \cos(lat_1)\cos(lat_2)\sin^2\left(\Delta\frac{lon}{2}\right) \quad (1)$$

$$c = 2a\tan2(\sqrt{a}, \sqrt{(1-a)})  \quad (2)$$

$$d = Rc \quad (3)$$

where lat is the latitude, lon the longitude, R the radius of the earth (6,371 km), and d the distance between two points. The function a tan 2 is the arctangent function taking two arguments, and for the arguments x and y, which are, of course, not both equal to zero, a tan 2(y, x) is the angle in radians between the positive x-axis of a plane and the point given by the coordinates (x, y) on it. The angle is positive for counter-clockwise angles, and negative for clockwise angles. The purpose of using two arguments instead of one, i.e. computing a a tan $$\left(\frac{y}{x}\right),$$

is to gather information on the signs of the inputs in order to return the appropriate quadrant of the computed angle, which is not possible for the single-argument arctangent function. It also avoids the problem of division by zero, as a tan 2(y, 0) will return a valid answer as long as y is non-zero.

For any given source and destination-coordinate a space-window of 1 km around it was defined (source and destination being the center), and the closest node in that space window was calculated. For this, a translation of $\varphi$ and $\lambda$ into x and y coordinates is required (eqs. 4, 5).

$$x = R \cos(\varphi) R \cos(\lambda) \quad (4)$$

$$y = R \cos(\varphi) R \sin(\lambda) \quad (5)$$

For determining the window coordinates, a square around $P_s=(x, y)$; $S\in\{source, destination\}$ was calculated. The example below calculates the north-eastern corner of the rectangle by adding northern and eastern distance to $P_s$ (eqs. 15, 16).

$$d_\varphi = \frac{d_{north}}{R} \quad (6)$$

$$d_\lambda = \frac{d_{east}}{R\cos\left(\frac{\pi}{180}\right)} \quad (7)$$

where $d_\varphi$ represents the distance in latitude, and $d_\lambda$ the distance in longitude. $d_{north}$ and $d_{east}$ give the distance to the north and distance to the east in meters. The new longitude and latitude, which in the described case is the northeastern corner of the space window centered around the source or destination coordinate of a route, the distance was added and converted back to coordinates (eqs. 8, 9).

$$\varphi_{new} = \varphi + d(\varphi) * \frac{180}{\pi} \quad (8)$$

$$\lambda_{new} = \lambda + d(\lambda) * \frac{180}{\pi} \quad (9)$$

Eqs. 8, 9 do, of course, require sign changes when the other three window corners are calculated.

Space and time windows include portions of an area of interest. If the area of interest can be included in a single window, then sliding the window to different portions of the area of interest in not necessary. When an area of interest can be including in a single window, is in part a function of the hardware used. Algorithms described herein and their equivalents can be used whether a single window covers the area of interest or if multiple windows are required.

For each vehicle ID and each source and destination node, all simple paths from source to destination were extracted. A simple path traverses several nodes from source to destination, but without returning to nodes which were already visited. Several thousands of simple paths per source-destination-pair (=per vehicle) might exist, depending on the length (=number of segments) of the initial route. For our example two simple paths were selected that are most dissimilar to the original route. This means that the selected routes share the lowest number of overlapping segments. The calculation performed was based on the Jaccard-similarity (eq. 10).

$$J(x, y) = \frac{\sum_i \min(x_i, y_i)}{\sum_i \max(x_i, y_i)} \quad (10)$$

Eq. 16 is the Jaccard similarity coefficient where $x=(x_1, x_2 \ldots, x_n)$ and $y=(y_1, y_2 \ldots, y_n)$, represent two routes with their respective segments, with all real $x_i, y_i \geq 0$. Defining $x_i, y_i \in \{0,1\}$, a 1 means a segment is contained in both routes, and a 0 means a segment is not contained in both routes. The Jaccard distance then may indicate which routes are sufficiently dissimilar to each other (eq. 11), i.e. routes with a similarity $J(x, y) \geq 0.5 \land J(x, y) \leq 0.75$.

$$d_J(x,y) = 1 - J(x,y) \quad (11)$$

Below is shown Car ID 10012 with assigned routes, split in segments {10012: [[30888192,146612995,25006941, 342687925,190375162,1903751,175388762,1466129 56,169587517], [30888192,169707874,146612995,25006941,169707825, 342687925,190375162,190375161,175 388762,146612956, 169587517], . . . ] . . . }

A traffic data example is as follows:

| vehicle_id | date_time | longitude | latitude |
|---|---|---|---|
| 1131 | 2/2/08 13:30 | 116.45804 | 39.86973 |
| 1131 | 2/2/08 13:30 | 116.45828 | 39.8697 |
| 1131 | 2/2/08 13:30 | 116.45847 | 39.86964 |
| 1131 | 2/2/08 13:31 | 116.45852 | 39.86954 |
| 1131 | 2/2/08 13:31 | 116.45851 | 39.86955 |
| 1131 | 2/2/08 13:31 | 116.45851 | 39.86956 |
| 1131 | 2/2/08 13:31 | 116.45859 | 39.86954 |
| 1131 | 2/2/08 13:31 | 116.45867 | 39.8695 |
| 1131 | 2/2/08 13:31 | 116.45889 | 39.86946 |
| 1131 | 2/2/08 13:31 | 116.45879 | 39.86946 |
| 1131 | 2/2/08 13:31 | 116.4588 | 39.86943 |

Formulation of the problem as a quadratic unconstrained binary optimization matrix will now be described. The definition of variables for the QUBO (eq. 24) required to cleanse the input. The alternative routes are determined classically, but in rare cases it is not possible to redistribute a vehicle to other locations in the given time window, i.e. there may not be an intersection or ramp available close to the actual vehicle position. Given that is true for a vehicle, it is not considered for redistribution (meaning that only one Qbit is used representing such a vehicle on the chip, which never be turned off for this vehicle). Nevertheless, the affected routes are considered for the redistribution of other vehicles whose other routes overlap at segments that can be used for their redistribution. Car ID 10012 with assigned routes, split in segments as provided above shows an example with road segments assigned to a vehicle ID. The goal of the optimization problem is to minimize the street occupancy in the given area. This is done for each vehicle by selecting one of the three possible routes ensuring the least overlaps among the routes. It is important to emphasize that in the example presented at CeBIT for each vehicle 3 alternative routes have been determined, not a set of 3 routes for all vehicles. For every unique combination of vehicle to route, a binary variable $q_{ij}$ may be defined that represents vehicle i taking route j. Because each vehicle can only occupy one route at a time, exactly one variable per vehicle must be true in the minimum of the QUBO. A constraint may be defined such that every vehicle is required to take exactly one route. This can be formulated as the following constraint (assuming 3 possible routes):

$$0 = \left(\sum_{j\in\{1,2,3\}} q_{ij} - 1\right)^2 = -q_{i1} - q_{i2} - q_{i3} + 2q_{i1}q_{i2} + 2q_{i2}q_{i3} + 2q_{i1}q_{i3} + 1 \quad (12)$$

simplified using the binary rule $x^2=x$. As stated previously, routes are described by lists of street segments (S being the list of all segments in the graph). Therefore, for all vehicles i, with proposed routes $j \in \{1,2,3\}$ with segments $S_j$, which share the street segment $s \in S_j$, the cost of the occupancy of the street segment is given by:

$$\text{cost}(s) = \left(\sum_i \sum_j \sum_{s \in S_j} q_{ij}\right)^2 \quad (13)$$

The global cost function for the QUBO problem can now be simply described by summing the cost functions for each street segment and the constraint from Equation 21:

$$Obj = \sum_{s \in S} \text{cost}(s) + \lambda \sum_i \left(\sum_j q_{ij} - 1\right)^2 \quad (14)$$

When summing components of the global cost function, the scaling parameter A must be introduced. This ensures that equation 12 is satisfied for all vehicles in the minimum of the QUBO. To find this scaling factor, it is required to find the maximum number of times some vehicle i is present in cost functions for the form equation 13, and use this value as A. This makes the cost of violating equation 13 greater than the cost of increasing the segment occupancy in every route by 1.

Now the cost function can be formulated as a quadratic, upper-triangular matrix, as required for the QUBO problem. A mapping of binary variable $q_{ij}$ for use to index in the QUBO matrix Q, given by I(i,j). These indices are the diagonals of the QUBO matrix. The elements of the matrix are the coefficients of the terms in the cost function. To add these elements to the QUBO matrix, whenever two routes j and j' share a street segment s:

1. A +1, linear in the binary variable at diagonal index I(i,j), for every vehicle i proposed with route j containing segment s.
2. A quadratic mixed term+2, for every pair of vehicles $i_1$ and $i_2$ taking route j containing segment s, is added.

Then, the constraints to enforce that every vehicle has only one route, as per Equation 12, are added:

1. For every vehicle i with possible route j, $(-\lambda)$ is added to the diagonal of Q given by index I(i, j).
2. For every cross-term arising from Equation 12, $(2\lambda)$ is added to the corresponding off-diagonal term.

A special case occurs if a vehicle is proposed only one route, meaning $q_{ij}=1$. As stated previously, despite vehicle i being assigned to route j, this assignment still affects other vehicles. This forces the quadratic constraint terms from Equation 13 to be turned into additional linear terms: $2q_{ij}q_{i'j'} \rightarrow 2q_{i'j'}$.

Additionally, by keeping a record of which routes every segment appears in, redundant constraints could be removed, as some routes may overlap in more than one segment.

Construction of the Ising-model from the quadratic unconstrained binary optimization matrix will now be described.

An Ising model is then constructed from the QUBO by:
Top: hs, bottom: Js
[158.5,
260.5,
156.0,
259.5,
1470.0, . . . ]
{(381, 392): 0.5,
(74, 1520): 0.5,
(653, 1222): 1.0,
(814, 1292): 1.5,
(618, 757): 0.5,
(1404, 1524): 0.5, . . . }

$$J_{ij} \leftarrow -Q_{ij} \quad (15)$$

$$h_i \leftarrow -\sum_k (Q_{ik} + Q_{ki}) \quad (16)$$

where k is the number of rows in the QUBO-matrix. The conversion from the initial $x_i \in \{0,1\}$ to $x_i \in \{-1,1\}$ happens by:

$$s_i = 2x_i - 1 \quad (17)$$

The h and J-terms take the forms described in FIG. 3, where (381, 392): 0.5 describes a coupling strength of 0.5 between the Qbits 381 and 392. In the described example, for example, 418 vehicles may be presented, each with 3 alternative routes, to the quantum annealing system.

However, the method is not limited to 418 vehicles, as by iterative execution of the algorithm on newly predicted hotspots, equilibrium is achieved over time. After the redistribution of vehicles given the predicted hotspots, hotspots are classically predicted given the new situation and the vehicles in the new target zone were optimized. As routes overlap, which is also a condition for the redistribution, the problem could be represented with 1694 logical Qbits and 2926 constraints. A challenge in this scenario is the restricted connectivity between Qbits, which limits the ability to directly solve arbitrarily structured problems. To solve a problem directly in the Quantum Central Processor (QPU) if there is an interaction between problem variables $s_1$ and $s_2$, then a physical connection (edge) must exist between the Qbits representing the values of these variables. For most problems, the interactions between variables do not match the Qbit connectivity. This limitation can be circumvented using embedding. However, this solution requires finding an embedding or mapping of problem variables to Qbits. Finding such an embedding is itself a hard optimization problem. In this example a chip was used that featured 1135 Qbits, thus it was not possible to embed it all on the chip at once, so the problem was split, for which the D-Wave tool QSage was used, which is, amongst other D-Wave tools. QSage is one example of a translator designed for optimization problems, but other translators may be used provided they have the functionality necessary required. Finally, the translation from Ising to QUBO, which has to happen after finding the energy minimum, is done by $$Q_{ij} \leftarrow -J_{ij} + \frac{\delta_{ij}}{2}\left(\sum_k (J_{ik} + J_{ki}) - h_i\right) \quad (18)$$

Expressed as pseudocode, the important high-level steps of the algorithm are as follows:
1. Do forever: predict hotspots $H=\{h_1, \ldots, h_n\}$ classically 15 minutes ahead of occurrence.
2. If $H \neq \{\}$:
   a. For each $h_x \in \{h_1, \ldots, h_n\}$:
   b. For each vehicle i:
      i. Determine the actual route $j_i$.
   c. For each route $j_i$:
      i. Map the source $j_{i_s}$ and destination $j_{i_d}$ to the nearest node in the road graph.
   d. For each $j_i$ with source and destination $\{j_{i_s}, j_{i_d}\}$:
      i. Determine all simple paths $P_{j_{x_s}j_{x_d}}=(p_1, \ldots, p_n)$.
      ii. For each $j_i$, calculate the alternative p by Jaccard similarity, which are those within the defined similarity range $J(x, y) \geq 0.5 \wedge J(x, y) \leq 0.75$.
      iii. For each vehicle $i_x$, define the set of possible routes $\{j_i, p_n, p_m\}$.
   e. Define the QUBO with binary variables $q_{ij}$ by setting the cost of occupancy per street segment at a given time t $S_{y_t}$ as $$\text{cost}(s) = \left(\sum_i \sum_j \sum_{s \in S_j} q_{ij}\right)^2$$

and applying a constraint such that a vehicle is only allowed to take one route by $\Sigma_j q_{ij}=1$
   f. If a vehicle i is given only one route:
      i. Set $q_{i,y_j}=1$
   g. Turn mixed term into an additional linear term for the other vehicle in the pair taking that route. Translate the problem into an Ising-model.
   h. Find suitable embedding.
   i. Repeat annealing cycles n times.
If no hotspots exist, then the above steps need not be executed.

Quantum annealing will now be described in more detail. The mathematical description of the problem at hand that is needed in order to present it to a D-Wave quantum computing software application (or other comparable quantum computing application), is the Hamiltonian $\mathcal{H}$.

$\mathcal{H}$ describes the physical system in terms of energies, taking the state of the system and putting out its energy. $\mathcal{H}$, of course, exists for both quantum and classical systems, but in terms of quantum annealing the concern is to find states of all the Qbits representing the problem that give the lowest energy when put into $\mathcal{H}$:

$$\mathcal{H}_s(s) = -\frac{1}{2}\sum_i \Delta(s)\sigma_i^x + \varepsilon(s)\left(-\sum_i h_i \sigma_i^z - \sum_{i<j} J_{ij}\sigma_i^z\sigma_j^z\right) \quad (19)$$

where the first term describes the initial $\mathcal{H}$, and the second term the final $\mathcal{H}$. The lowest energy state of the initial $\mathcal{H}$ is given by all Qbits in superposition, which is the configuration the system is initialized with. $\Delta(s)$ stands for the equally weighted probability amplitudes of Qbits $\sigma_i^x$. The final $\mathcal{H}$, also called problem $\mathcal{H}$, is what needs to be solved for the lowest energy state, which will describe the answer to the presented problem. $h_i$ defines the probability amplitudes or biases on each Qbit, indicating the probability of it collapsing into either of the states 0 or 1. $\varepsilon(s)$ describes the strength of the second term's influence and increases over time, $J_{ij}$ defines the coupling between Qbits $\sigma_i^z$ and $\sigma_j^z$, which is described in more below. Generally, to directly submit a problem to the quantum processing unit (QPU), it must either be reduced to an Ising model or a quadratic unconstrained binary optimization (QUBO) instance. The general Ising model problem is defined as described on a graph $G=(V, E)$ on n vertices (see eq. 1). Each vertex $1 \leq i \leq n$ can take on a value $s_i \in \{-1, 1\}$, and is assigned a bias (weight) $h_i$. Furthermore, between two vertices $1 \leq i < j \leq n$, the weight on the edge (i, j) is denoted by $J_{ij}$. A configuration is an assignment of spins to the vertices, and the energy of the configuration, which is our problem $\mathcal{H}$, is then given by eq. 20:

$$\mathcal{H}(S) = \sum_{i=1}^n h_i s_i + \sum_{i<j} J_{i,j} s_i s_j \quad (20)$$

As indicated, a configuration that minimizes $\mathcal{H}(S)$:

$$S_{min} = \underset{S}{\mathrm{argmin}}(\mathcal{H}(S)) \quad (21)$$

The problem is provided as vector h and matrix J containing the biases and weights, thus can be represented in the matrix notation $$\mathcal{H}(S) = s^T J s + s^T h \quad (22)$$

where $$s^T = (s_1, s_1, \ldots s_n)^T \quad (23)$$

Figure 8:
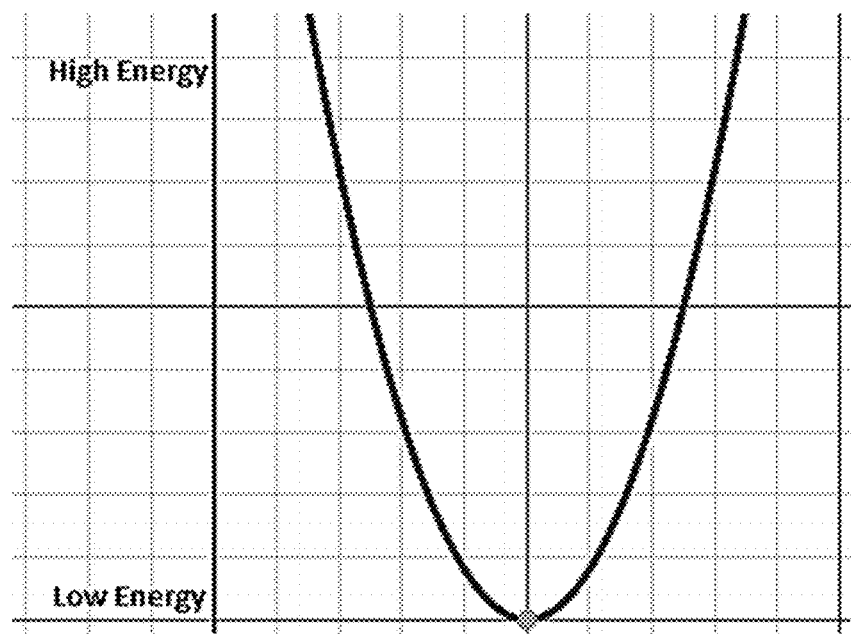
FIG. 8 depicts the initial superposition state represented by the minimum energy of a 1-Qbit quantum annealing system.

The QUBO formulation of a problem is very similar to the Ising energy function, which is given by eq. 24:

$$\vec{x}_{opt} = \mathrm{argmin}\left\{\sum_{i \leq j=1}^N Q_{ij} x_i x_j\right\}, x_i \in \{0, 1\} \quad (24)$$

where $Q \in \mathbb{R}^{n \times n}$ and Q is an n×n upper triangular matrix of real weights, and x a vector of n binary variables. Note that the states in the initial $\mathcal{H}$ are quantum states, and the states in the final $\mathcal{H}$ are classical states, which mean that during the annealing each state makes a transition from a quantum object to collapsing into a classical object, which also indicates that the initial $\mathcal{H}$ will, in the course of the annealing cycle, become 0. Thus, the system always starts in the minimum energy configuration, which is separated from any other energy level. As the problem $\mathcal{H}$ is introduced, other energy levels get closer to the lowest energy-level, which poses a challenge: the smaller the gap between the energy states, the more likely it is that the system will jump from its lowest energy configuration into one of the excited states. The so-called minimum gap is the point where the first excited state approaches the ground state closely, and thermal fluctuations or too short annealing times could result in the system jumping from the ground state to an excited state. If the annealing happens slowly enough, meaning that the system stays in the ground state, it follows an adiabatic process. This is particularly worth mentioning, because the larger the system is, the more unlikely it will remain in the ground state during the annealing cycle. However, even if it jumps to one of the first excited states, this result can be useful, but the larger the system becomes, the more difficult it will be to classically validate if it really came up with the optimal (minimum energy) solution, or one of the first excited states. Brute force is, for example, classically intractable for $10^6$ Qbits. The quantum annealing systems used in the example described herein are built upon superconducting Qbits—rings made of Niobium, and the states are encoded in circulating currents, and a corresponding magnetic field. Due to superconductivity, superposition is maintained by inducing charge in both directions at once, creating an up and a down magnetic field, corresponding to the states of 1 and 0. In terms of an energy function, the superposition state corresponds to the lowest point in the function's single valley as diagrammed in FIG. 8, which shows the initial superposition represented by the minimum energy of the 1-Qbit system.

Figure 9:
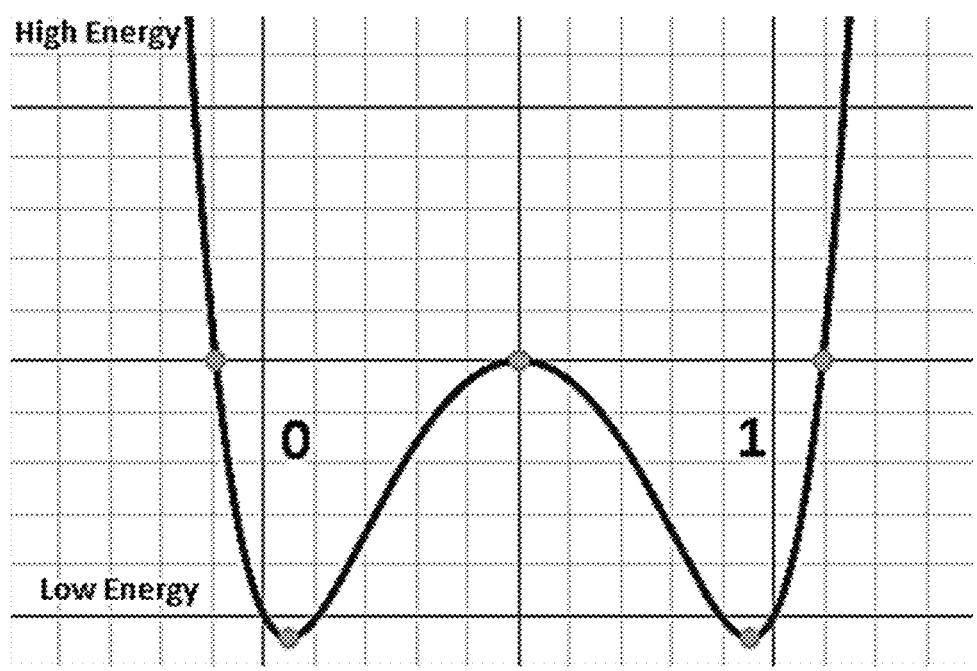
FIG. 9 depicts a stage of a quantum annealing process in which a barrier is raised, turning the energy diagram into a double-well potential.
Figure 10:
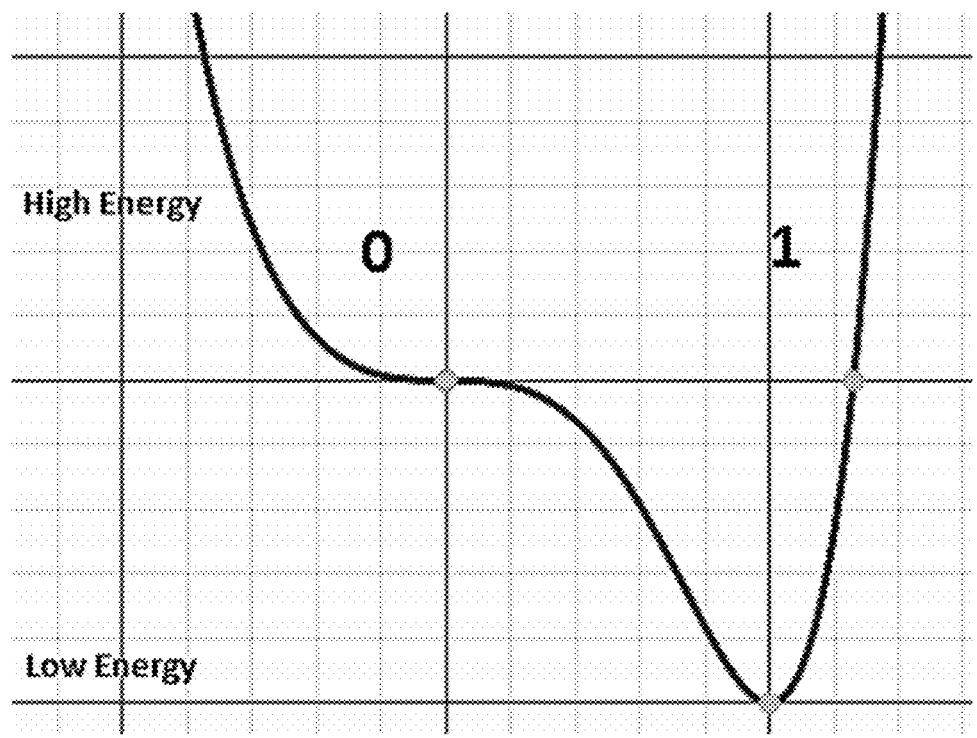
FIG. 10 depicts a further stage of a quantum annealing process showing tilting of a double-well potential by the application of external magnetic fields.

During the process of quantum annealing, a barrier is raised, turning the energy diagram into a double-well potential, where in FIG. 9 the low point of the left valley represents the state 0, and the low point on the right the state 1. The initial probability of ending up in either the state 0 or the state 1, is, given an equally-weighted superposition, ½ for each. However, the probabilities can be controlled, which is done by the application of external magnetic fields, called bias, which tilts the double-well potential and so increases the probability of the system for ending up in the lower well. The Qbit is minimizing its energy by the application of the bias, See FIG. 10, which shows tilting of the double-well potential by the application of external magnetic fields.

Additional devices, allowing for entanglement, are the couplers. Entanglement refers to correlating Qbits in a way that they cannot be described as separate subsystems and are thus treated as one object. Therefore, in a two Qbit-system the change of one Qbit's amplitudes also affects the second Qbit, and they can be correlated such that if $q_1$ ends up in a certain state, $q_2$ is forced to take the same or opposite state. However, the object $q_1q_2$ can take 4 different states S={00, 01,10,11}, and the relative energy of these states depends on the biases of each Qbit, and the coupling between them. This is how a program on the quantum annealing system used was defined: choosing a set of biases and couplings defines an energy-landscape, and the system will, theoretically, end up in the minimum energy configuration.

A further quantum physical effect of relevance here, next to superposition and entanglement, is quantum tunneling. The chip represents a problem as energy surface, with good solutions being valleys, and bad solutions sitting on hills. A classical algorithm would represent the problem in the same way, but where a classical algorithm can sort of "walk" the surface, the chip is capable of tunneling through the energy barriers of the surface: it tunnels computationally through the landscape. The charges in the Qbits can, once the Qbits are entangled, tunnel through the chip from one Qbit to another. Therefore, it may be far less likely that the chip gets stuck in a local minimum, and may also finds the answer far more quickly.

The disclosed embodiments and their equivalents are based on a combination of classical machine learning and quantum annealing, the latter being a fundamentally new method for solving complex optimization problems. Furthermore, the entire traffic flow problem has been reformulated as a quadratic unconstrained binary optimization, which is not only the requirement for solving the problem by means of quantum annealing, but also a fundamentally new way to represent the problem per se. Alternative methods cannot solve the very same problem given the time constraints. Furthermore, none of the existing approaches considers the following:

Maximizing the flux in one area should not result in a significant decrease flux in another area.

Flux optimization has to happen permanently, ideally based on the interval data from vehicles is transmitted.

Traffic flux minimization must be recognized before it happens, for example, up to 15 minutes ahead. Only upon a sufficiently timed prior recognition of traffic flux minimization, can the routes all vehicles in the network should take can be distributed such that congestions is avoided.

By using quantum, computing in combination with classical computing, the system may reduce bandwidth needed and memory usage, while providing a faster solution.

The solution is not obvious, as alternative solutions leverage classical algorithms and classical hardware. For the first time, the disclosed traffic flux maximization methods and systems and their equivalents solve the traffic flow problem by translating it into a formulation that can be solved on a quantum annealing system.

For the verification of the presented method motion data of a subset of agents contributing to traffic, captured by GPS-signals transmitted in 1-5 second-intervals was considered. Although an almost evenly distributed subset of agents allowed an understanding of the traffic situation at a given point in time, redistribution without considering all agents may not maximally improve the traffic situation, especially not for the agents the system does not have access to. Such agents contributing to traffic flow are, for example, means of public transportation, pedestrians, cyclists, and infrastructure components. The latter can be optimized based on traffic flow as well, i.e. intelligent traffic light switching.

There are efficient classical solvers which may be able to find the global minimum to the posed problem. However, traffic flow optimization is time-critical and continuous, thus the optimal solution or a solution close to the optimum should be calculated as quick as possible. Classical algorithms, such as simulated annealing or evolutionary search, cannot compute a better answer in shorter time, compared to quantum annealing. The "better" answer out of two answers is, in this case, the one resulting in less time from source to destination for all vehicles in the traffic graph. In other words, the better answer gives less global time. Hardware selection may be based on a technical point of view. Both performance and accuracy of the solution are very important for maximizing traffic flux. The disclosed combination of quantum annealing and classical computing using the methods and systems provided herein appear to reach a desirable balance as compared to using only classical computing. The improvement compared to the regular genetic algorithm is negligible.

In accordance with disclosed embodiments, the problem size may be varied using square subgraphs of the full graph, from 10 vertices up to 1694 vertices. The number of problem variables grows quadratically with Chimera size. Additionally, it should be noted, that, if the classical algorithms are stopped before convergence, a "good" solution (=approximation of the optimum) can be found; however this solution will not be better than what may be determined using quantum annealing.

Figure 11A:
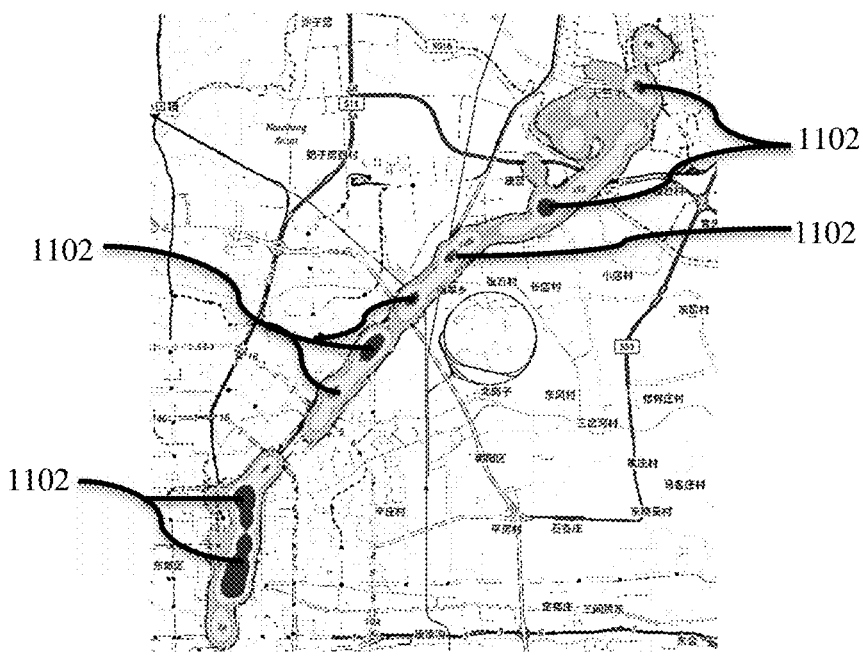
FIGS. 11A and 11B depict a traffic situation on an area of a map at a given time that has not been optimized, and a traffic situation of the same area of the map at a given time with continuous optimization, respectively.
Figure 11B:
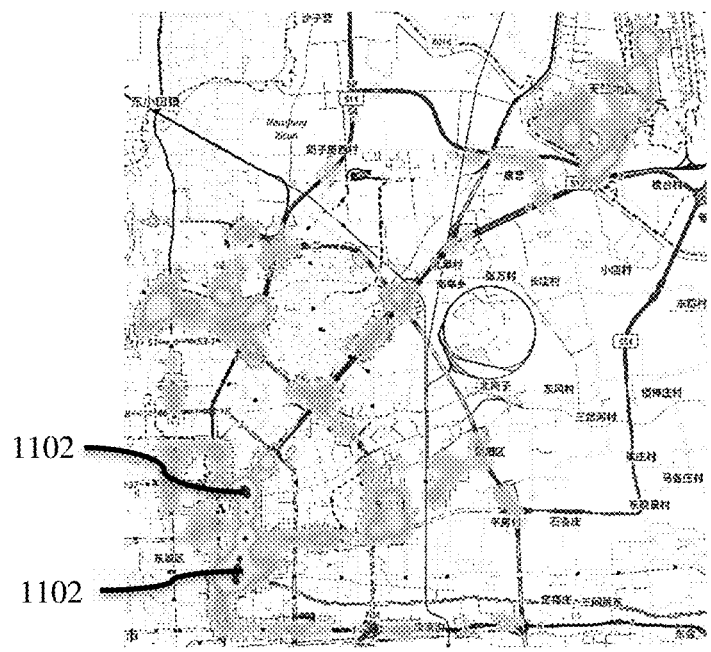

FIG. 11A shows a traffic situation on a map at a given time that has not been optimized by disclosed embodiments of the traffic flux maximization method and system. FIG. 11B depicts a traffic situation of the same area of the map at a given time with continuous optimization, according to disclosed embodiments. FIG. 11A shows a shaded area of traffic that is contained along a single route. FIG. 11B shows the same traffic dispersed along multiple routes, thereby optimizing traffic flux. A plurality of hotspots 1102, depicted as dark areas, are shown in FIGS. 11A, 11B. Hotspot 1102 are more prevalent in the non-optimized traffic situation shown in FIG. 11A. Very few hotspots 1102 are present in the continually optimized traffic situation, of FIG. 11B.

Embodiments include the methods described herein and their equivalents, a non-transitory computer readable medium programmed to carry out the methods and a system configured to carry out the methods. Further included is a vehicle comprising components that include any of the embodiments or components of the embodiments of the immediately preceding sentence. The computer system, and any sub-computer systems include a machine readable storage medium containing an executable code; one or more processors; memory coupled to the one or more processors; an input device, and an output device connected to the one or more processors. The system and methods can be coordinated on a server or other communications network or system.

Various embodiments of the invention have been described, each having a different combination of elements. The invention is not limited to the specific embodiments disclosed, and may include different combinations of the elements disclosed, omission of some elements or the replacement of elements by the equivalents of such structures.

The invention claimed is:

1. A vehicle traffic control system comprising:
a traffic monitoring system configured using classic computing to monitor traffic flow in a selected area as a point in time;
a traffic prediction system configured using classic computing to predict traffic flow minimization prior to occurrence of the traffic minimization flow based on information from the traffic monitoring system; and
a means for combining machine learning on classical computing to predict traffic flux minimization before occurrence, with quantum annealing to optimize future positions of vehicles such that a redirection minimizes travel time for each vehicle under consideration of all other cars in a road network.

2. The system of claim 1, further comprising a traffic optimization system configured using quantum computing to provide an alternative route to a vehicle based on information from the traffic prediction system.

3. The system of claim 2, further comprising a vehicle control system configured to receive information from the alternative route from the traffic optimization system and provide an output to the vehicle to reroute the vehicle on the alternative route.

4. The system of claim 3, further comprising:
one or more quantum processing units for receiving signals from the traffic prediction system;
and one or more central processing units for receiving signals from the traffic monitoring system;
one or more non-transitory computer-readable storage media in which are stored computer code that when executed on the one or more quantum processing units and the one or more central processing units causes a traffic flow maximization system to perform the method of:
using classical computing to identify areas where traffic flux minimization occurs, determine spatially and temporally valid alternative routes, and formulate a problem as an energy matrix wherein elements of the matrix are coefficients of terms of a cost function;
using quantum annealing to find a minimum energy solution, which represents an ideal distribution of vehicles by minimizing time in a selected whole traffic graph;
using classical computing to redistribute the vehicle based on the matrix produced; and
repeating the above steps to maximize traffic flow by approaching prediction of no traffic flow minimization for a given time window.

5. A method for controlling traffic flow comprising:
predicting traffic flux minimization before occurrence using machine learning on a classical computer; and
optimizing future positions of vehicles such that a redirection maximizes traffic flux to minimize travel time for each vehicle, wherein optimization includes accounting for other vehicles in a road network using quantum annealing.

6. The method of claim 5, further comprising:
using classical computing to identify areas where traffic flux minimization occurs, determine spatially and temporally valid alternative routes, and formulate a problem as an energy matrix wherein elements of the matrix are coefficients of terms of a cost function;
using quantum annealing to find a minimum energy solution, which represents an ideal distribution of vehicles by minimizing time in a selected whole traffic graph; using classical computing to redistribute the vehicle based on the matrix produced; and
repeating the above steps to maximize traffic flow by approaching prediction of no traffic flow minimization for a given time window.

7. The method of claim 6 further comprising:
dividing a plurality of roads into segments;
defining overlapping time windows each of the same amount of time;
analyzing historic data to identify where a threshold number of vehicles per time is exceeded;
predicting traffic flux minimization a selected amount of time before it occurs by implementing a classic classifier.

8. The method of claim 7, wherein the selected amount of time is in the range of greater than zero to 18 minutes.

9. The method of claim 8, wherein the selected amount of time is in the range of 10 minutes to 16 minutes.

10. The method of claim 7, wherein predicting the traffic flux minimization selected amount of time before it occurs includes:
using a convolutional neural network to learn patterns in the historic data that cause traffic flux minimization; and
outputting from the neural network a first neuron estimating a probability of a traffic jam, and a second neuron estimating a probability of no traffic jam.

11. The method of claim 6 wherein the cost function is occupancy of a street segment for all vehicles i, with proposed routes j∈{1,2,3} with segments $S_j$, which share the street segment s∈$S_j$, and is given by:

$$\text{cost}(s) = \left(\sum_i \sum_j \sum_{s \in S_j} q_{ij}\right)^2$$

wherein $q_{ij}$ is a binary variable that defines each unique combination of vehicle to route that represents vehicle I taking route j.

12. The method of claim 6, further comprising:
setting a starting window; and
predicting a probability that traffic flux minimization will occur within the window.

13. The method of claim 6, wherein determining alternative routes comprises:
redirecting vehicles so time from each vehicle's source location to its target location is minimized taking into consideration vehicles already on the alternative routes by;
splitting a road graph into segments and nodes, wherein each segment and each node has a unique ID;
mapping GPS coordinates onto the road graph;
for each predicted traffic flux minimization, identified by a node or a segment and corresponding GPS coordinates, defining a space-window around it;
determining GPS coordinates of the space-window;
extracting all paths from source to destination for each vehicle ID and each source node and destination node; and
providing a plurality of alternative routes based on a dissimilarity calculation between the alternative routes, wherein the alternative routes are alternative to an original route;
wherein sufficiency of similarity between routes depends on characteristics of the traffic graph.

14. The method of claim 13, wherein the GPS coordinates are mapped onto the road graph by calculating a Haversine distance between each segment's or node's GPS coordinates and the vehicle GPS coordinates.

15. The method of claim 13, further comprising applying a unique ID to each segment and to each node.

16. The method of claim 13, wherein segments and segment IDs are extracted from a map system in which the IDs are incorporated.

17. The method of claim 6, wherein the problem is formulated as a quadratic unconstrained binary optimization (QUBO) matrix by:
minimizing street occupancy in a given area, wherein the street occupancy is the sum of the cost functions for each segment, by:
selecting one of three possible routes for each vehicle that has the least segment overlaps among the routes;
wherein selecting one of three possible routes ensuring the least overlaps among the routes comprises:
keeping a record of which routes each segment appears in;
identifying and removing redundant constraints wherein each segment is constrained by a number of occurrences in all routes;
identifying and constraining any unique combination of segments in every route;
for each non-redundant segment per vehicle, constraining any segment of a created matrix in a diagonal by the number of occurrences in all routes;
creating a scaling factor for the constraints; and
mapping vehicles to quantumbits by representing each vehicle with a Qbit for each of its routes.

18. A non-transitory computer-readable storage medium in which is stored computer code that when executed on one or more central processing units and one or more quantum processing units causes a traffic flow maximization system to perform the method of:
using classical computing:
identifying areas where traffic flux minimization occurs;
determining spatially and temporally valid alternative routes; and
formulating a problem as an energy matrix wherein the elements of the matrix are coefficients of terms of a cost function;
using quantum annealing:
finding a minimum energy solution, which represents an ideal distribution of vehicles by minimizing time in a selected whole traffic graph;
using classical computing:
redistributing the vehicle based on the matrix produced; and
repeating the above steps to maximize traffic flow by approaching prediction of no traffic flow minimization for a given time window.

* * * * *